US007958461B2

(12) United States Patent
Yang

(10) Patent No.: US 7,958,461 B2
(45) Date of Patent: Jun. 7, 2011

(54) METHOD OF INPUTTING CHARACTERS ON A WIRELESS MOBILE TERMINAL

(75) Inventor: Moon-Hwan Yang, Yongin-shi (KR)

(73) Assignee: Samsung Electronics Co., Ltd (KR)

( * ) Notice: Subject to any disclaimer, the term of this patent is extended or adjusted under 35 U.S.C. 154(b) by 843 days.

(21) Appl. No.: 10/317,813

(22) Filed: Dec. 12, 2002

(65) Prior Publication Data

US 2004/0012642 A1 Jan. 22, 2004

(30) Foreign Application Priority Data

Jul. 22, 2002 (KR) .................. 10-2002-0042898

(51) Int. Cl.
*G06F 3/00* (2006.01)
*G06F 9/00* (2006.01)
*G06F 17/00* (2006.01)

(52) U.S. Cl. ........ 715/864; 715/762; 715/764; 715/865; 715/811

(58) Field of Classification Search .................. 715/455, 715/816, 864, 811, 762, 763, 764, 269, 840, 715/865, 780; 345/172, 169, 168
See application file for complete search history.

(56) References Cited

U.S. PATENT DOCUMENTS

| | | | | |
|---|---|---|---|---|
| 5,761,687 A | * | 6/1998 | Hon et al. ................ | 715/531 |
| 5,805,911 A | * | 9/1998 | Miller ..................... | 715/534 |
| 6,028,538 A | * | 2/2000 | Ramesh et al. ............ | 341/24 |
| 6,204,848 B1 | * | 3/2001 | Nowlan et al. ............ | 715/810 |
| 6,803,864 B2 | * | 10/2004 | Chan ....................... | 341/22 |
| 6,847,706 B2 | * | 1/2005 | Bozorgui-Nesbat ....... | 379/93.27 |
| 6,848,080 B1 | * | 1/2005 | Lee et al. ................. | 715/533 |
| 2003/0234821 A1 | * | 12/2003 | Pugliese .................... | 345/816 |

FOREIGN PATENT DOCUMENTS

| KR | 1020000044287 | 7/2000 |
|---|---|---|
| KR | 1020020039421 | 5/2002 |

* cited by examiner

*Primary Examiner* — Tadeese Hailu
*Assistant Examiner* — Anita D Chaudhuri
(74) *Attorney, Agent, or Firm* — The Farrell Law Firm, P.C.

(57) ABSTRACT

Provided is a method in a wireless mobile terminal for inputting characters. The method includes computing a probability value for each character which may be entered after a user inputs a particular character from among characters assigned to each button on a key input section by pressing a button and, storing the probability value in a memory of the mobile terminal, the probability value being based on a detection frequency of each character to be detected after a particular character in preset words. A character, as a first input character, having been inputted by the user according to the number of times a first button has been pressed in character input mode, based on a first character arrangement preset on the first button, is displayed on a display section. The probability value for each character which is probable to be entered after the first input character, among characters assigned to all buttons of the key input section is read from the database, and a second character arrangement in the order of probability values for the characters assigned to each button is then determined. A character inputted by the user according to the pressing number of a second button, based on a second character arrangement preset on the second button is displayed as a second input character.

8 Claims, 5 Drawing Sheets

METHOD OF INPUTTING CHARACTERS ON A WIRELESS MOBILE TERMINAL

PRIORITY

This application claims priority to an application entitled "Method of Inputting Characters on a Wireless Mobile Terminal" filed with the Korean Intellectual Property Office on Jul. 22, 2002 and assigned Serial No. 2002-42898, the contents of which are incorporated herein by reference.

BACKGROUND OF THE INVENTION

1. Field of the Invention

The present invention relates to a wireless mobile terminal, and more particularly to a method of inputting characters on a wireless mobile terminal.

2. Description of the Related Art

Due to the development of mobile telecommunications, wireless mobile terminals have been developed and widely supplied, enabling users to communicate over the phone during their travels. Through such wireless mobile terminals, it is possible to transmit and receive data, such as characters, as well as voice. The wireless mobile terminals comprise a key input section for inputting data, such as characters, in order to transmit and receive data.

It is a current trend that wireless mobile terminals are becoming smaller and lighter to improve their portability. As the size of terminals becomes smaller, the area occupied by the key input section has been reduced. As a result, most current terminals comprise only basic function keys and number keys. However, the number of required keys on terminals is increasing, because the terminals are required to perform various functions. Therefore, terminals have been developed so that a single key can perform different operations according to the time and number of key-pressings. It is easy to set up a key for performing one operation (for example, pressing the "1" key for a longer duration in order to select a function mode). However, in a case where a plurality of characters must be inputted, the number of keys on the key input section is not sufficient to set up each key to input a particular character according to the key-pressing time and number. To solve this problem, conventional terminals assign a plurality of characters to a single key so that the plurality of characters can be inputted according to the number of key-pressings. For example, a plurality of alphabetic characters are imprinted on each key pad of a terminal. The user can input an alphabetic character by pressing the corresponding key pad from one to three times, according to the order in which the character is imprinted on the key pad. However, it is cumbersome and time-consuming to repeatedly press a key pad. Also, it will shorten the life of the key pad.

SUMMARY OF THE INVENTION

Accordingly, the present invention has been made to solve the above-mentioned problems occurring in wireless mobile terminals as per the prior art. A first object of the present invention is to provide a method of minimizing the number of key inputs when inputting characters on a wireless mobile terminal.

A second object of the present invention is to provide a method of facilitating the input of characters on a wireless mobile terminal.

A third object of the present invention is to provide a method of inputting alphabetic characters, which enables the user to easily input alphabetic characters on a wireless mobile terminal.

In order to accomplish the aforementioned objects, a method of inputting characters on a wireless mobile terminal according to the present invention comprises computing a probability value for each character which may be entered after a user inputs a particular character from among characters assigned to each button on a key input section of the wireless mobile terminal by pressing a button, storing the probability value in a memory of the mobile terminal, said computing step being based on a detection frequency of each character to be detected after a particular character in preset words; displaying on a display section, as a first input character, a character having been inputted by the user according to the number of times a first button has been pressed in character input mode, based on a first character arrangement preset on the first button, on a display section; reading from the database the probability value for each character which is probable to be entered after the first input character, among characters assigned to all buttons of said key input section; determining a second character arrangement in the order of probability values for the characters assigned to each button; and displaying, as a second input character, a character inputted by the user according to the pressing number of a second button, based on a second character arrangement preset on the second button, on the display section.

BRIEF DESCRIPTION OF THE DRAWINGS

The above and other objects, features and advantages of the present invention will be more apparent from the following detailed description taken in conjunction with the accompanying drawings, in which.

DETAILED DESCRIPTION OF THE PREFERRED EMBODIMENT

Figure 1:
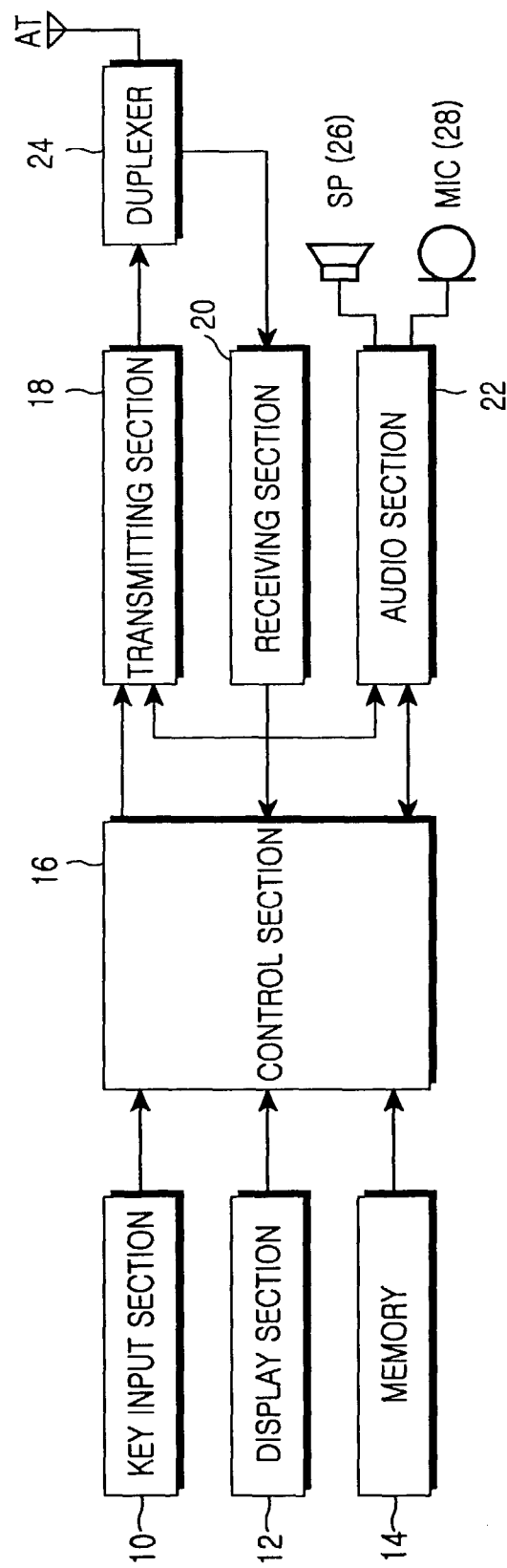
FIG. 1 is a block diagram showing a wireless mobile terminal according to one embodiment of the present invention.

Hereinafter, a preferred embodiment of the present invention will be described in detail with reference to FIGS. 1 to 6. In the drawings, the same element, although depicted in different drawings, will be designated by the same reference numeral or character. In the following description of the present invention, a detailed description of known functions and configurations incorporated herein will be omitted when it may obscure the subject matter of the present invention.

FIG. 1 is a block diagram of a wireless mobile terminal according to the embodiment of the present invention.

Referring to FIG. 1, the wireless mobile terminal according to the embodiment of the present invention comprises a control section 16, a key input section 10, a display section 12, a memory 14, a transmitting section 18, a receiving section 20, a duplexer 24, an audio section 22, a speaker (SPK) 26, and a microphone (MIC) 28, and an antenna AT.

The control section 16 controls the overall operation of the wireless mobile phone, and performs a controlling operation in alphabetic character input mode according to the embodiment of the present invention. The memory 14 comprises a ROM (Read Only Memory), a RAM (Random Access Memory), a void memory and the like in order to save a plurality of programs and data. The transmitting section 18 receives a signal generated at the control section 16, and transmits the signal to the duplexer 24 after wireless digital modulation. The duplexer 24 sends through the antenna AT the wireless signal received from the transmitting section 18, and delivers a signal received through the antenna AT to the receiving section 20. The receiving section 20 demodulates the wireless signal received from the duplexer 24 and transfers the signal to the control section 16. The control section 16 then performs a controlling operation according to the signal received from the receiving section 20. The audio section 22, under the control of the control section 16, converts the voice data received from the receiving section 20 into an audible sound, and outputs the sound through the speaker (SPK) 26. The audio section 22 databases a voice signal received from the microphone (MIC) 28 and outputs it to the control section 16. Also, the audio section 22, under the control of the control section 16, converts an incoming signal received from the receiving section 20 into an audible sound, and outputs a bell sound through the speaker 26. The display section 12, which may comprise a LCD (Liquid Crystal Display) or the like, outputs various display data generated from the terminal. As a part for interface with the user, the key input section 10 comprises various function keys and a plurality of keys for communication or for inputting characters.

According to the embodiment of the present invention, in order for the user of a mobile terminal to easily input alphabetic characters by minimizing the number of key inputs, the probability value for each alphabetic character, which is the probability of that character being entered after any particular alphabetic character having been inputted by pressing a button, is computed and stored at a memory. The probability value can be obtained based on the words which are stored in consideration of the number and actual usage frequencies of words carried in a dictionary. The number and actual usage frequencies of words in a dictionary are not fixed values. Moreover, the number of words stored is variable depending on users. In the embodiment of the present invention, probability values for alphabetic characters in 3,000 frequently-used words are stored at the memory of the mobile terminal.

Figure 2:
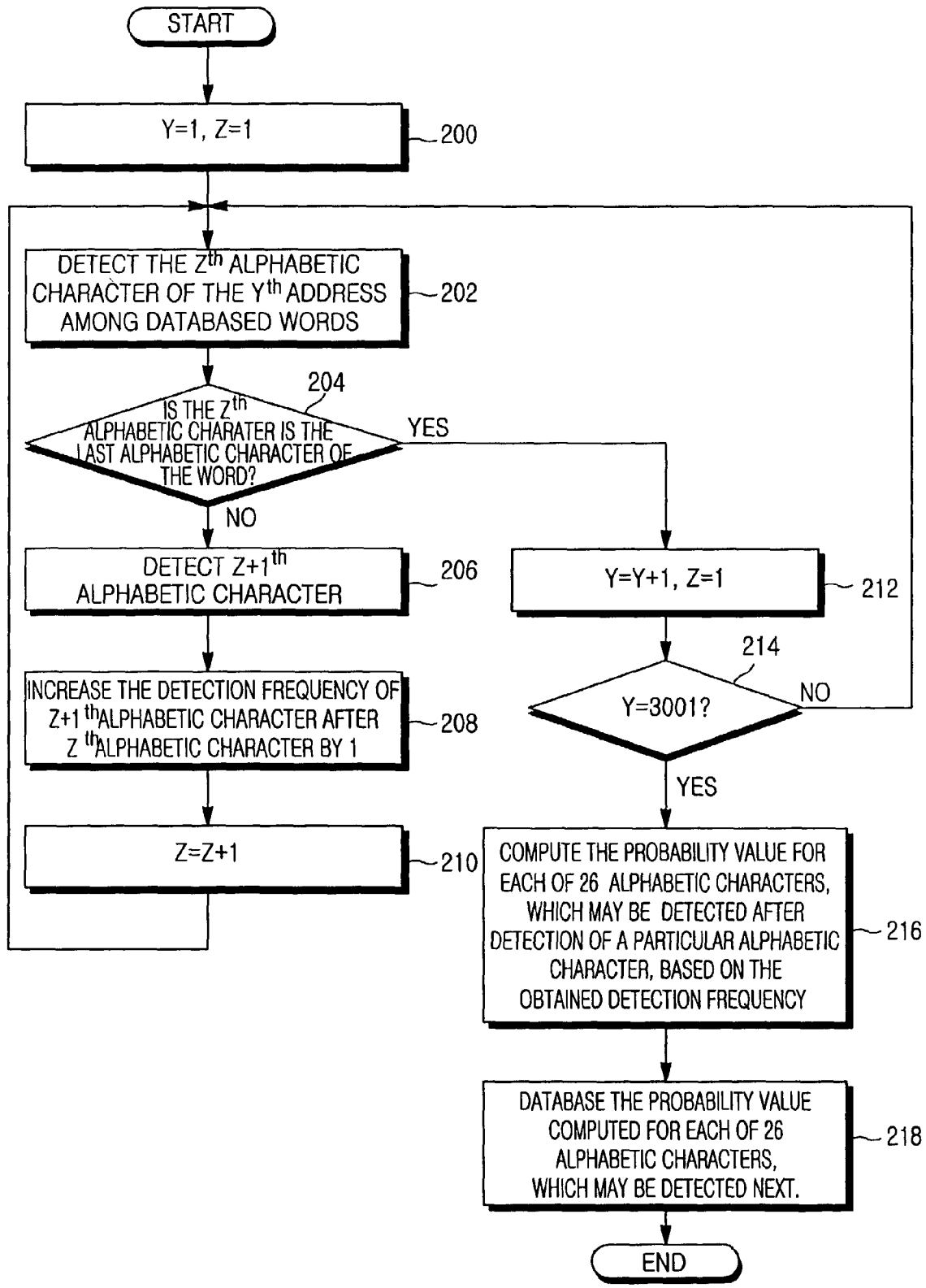
FIG. 2 is a control flow chart showing the process of computing and databasing a probability value according to the embodiment of the present invention.
Figures 3, 4:
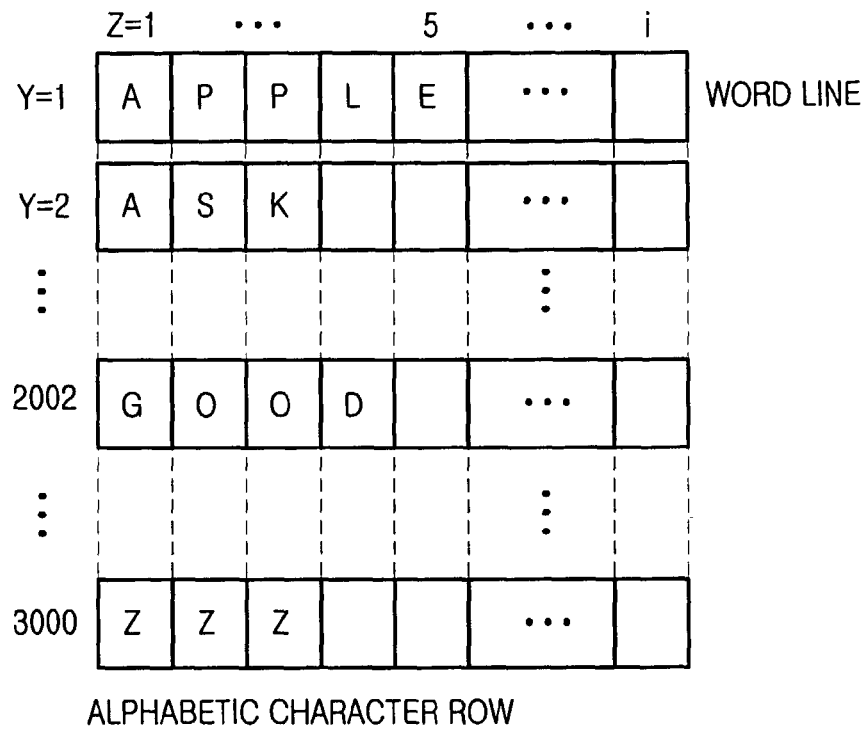
FIG. 3 shows how to compute the probability values for alphabetic characters in 3,000 frequently-used words, according to the embodiment of the present invention.
FIG. 4 shows a table databasing the probability values computed according to the embodiment of the present invention.

FIG. 2 is a control flow chart showing the process of computing and storing a probability value according to the embodiment of the present invention. FIG. 3 shows how to compute the probability values for 3,000 frequently-used words according to the embodiment of the present invention. FIG. 4 shows a table representing the probability values computed according to the embodiment of the present invention. Preferably, the controlling operation for computing and databasing the probability values according to the embodiment of the present invention should be performed by an external device such as a computer. The probability values computed and stored according to the embodiment of the present invention are loaded and stored in the memory of the mobile terminal.

A method of computing a probability value and storing it in the mobile terminal according to the embodiment of the present invention will be described in detail with reference to FIGS. 1 to 4.

At step 200 in FIG. 2, variables Y=1 and Z=1 are set as initial values. As shown in FIG. 3, variable Y represents a word line of each of frequently-used 3,000 words. Variable Z represents an alphabetic character row of each of the 3,000 words. Therefore, Y is a natural number of 1 to 3,000, and Z is a natural number of 1 to i (i represents the number of alphabetic characters in each of the 3,000 words).

Step 202 in FIG. 2, which follows step 200, detects the $Z^{th}$ alphabetic character of the $Y^{th}$ word. For example, as shown in FIG. 3, if the first of the pre-selected 3,000 words is "APPLE," the alphabetic character corresponding to Y=1 and Z=1 is "A."

At step 204 in FIG. 2, it is determined whether the $Z^{th}$ (Z=1) alphabetic character is the last alphabetic character of the $Y^{th}$ (Y=1) word. If the detected $Z^{th}$ alphabetic character is not the last alphabetic character of the $Y^{th}$ word, the $Z+1^{st}$ alphabetic character is detected at step 206. Referring to FIG. 3, the $Z^{th}$ (Z=1) alphabetic character is the first alphabetic character, not the last, of the $Y^{th}$ (Y=1) word "APPLE." As a result, step 204 is performed to detect "P" which is the $Z+1^{st}$ (=2) alphabetic character. Step 208 is then performed.

Step 208 in FIG. 2 increases the detection frequency of the $Z+1^{st}$ (=2) alphabetic character "P" after "A" by 1. At next step 210, the value of Z (=1) is increased by 1 to become Z=2. Step 202 is then repeated to detect the $Z^{th}$ (=2) alphabetic character of the $Y^{th}$ (=1) word. As shown in FIG. 3, the $Z^{th}$ (=2) alphabetic character "P" of the $Y^{th}$ (=1) word "APPLE" is detected. Since the $Z^{th}$ (=2) alphabetic character detected by the determination at step 204 is not the last alphabetic character of the $Y^{th}$ (=1) word, the $Z+1^{st}$ (=3) alphabetic character "P" is detected at step 206. Thus, step 208 in FIG. 2 increases the detection frequency of the $Z+1^{st}$ (=3) alphabetic character "P" after the $Z^{th}$ (=2) alphabetic character "P" by 1. At the next step, step 210, the value of Z is increased by 1 to be Z=3. Step 202 is then repeated.

By repeating steps 202 through 210 in FIG. 2 in the same manner as explained above, the detection frequencies of alphabetic characters "P," "P," "L" and "E," which may be detected after alphabetic characters "A," "P," "P" and "L," respectively, can be obtained.

If it is determined at step 204 that the $Z^{th}$ alphabetic character is the last alphabetic character of the $Y^{th}$ word, for example, if the $Z^{th}$ (=5) alphabetic character is the last alphabetic character "E" of the $Y^{th}$ (=1) word "APPLE," step 212 will then be performed.

Step 212 in FIG. 2 increases Y value by 1 to be Y=2. Step 214 is then performed so that steps 202 through 210 can be proceed regarding the $Y+1^{st}$ (=2) word, for example, "ASK," which is the next of the $Y^{th}$ (=1) word, as shown in FIG. 3. At step 214, it is determined whether Y value is 3,001. If Y value is 3,001, step 216 will be performed, because the Y value of 3,001 means that detection frequencies were obtained for the alphabetic characters which may be detected after each alphabetic character of each of the selected 3,000 words. If Y value is not 3,001, step 202 will then be repeated, because detection frequencies were not obtained for the alphabetic characters which may be detected after each alphabetic character of each of the selected 3,000 words. Also, steps 202 through 214 will be repeated until Y becomes 3,001. Through these repeated steps, the detection frequencies of alphabetic characters which may be detected after each alphabetic character of each of the 3,000 words can be obtained.

As described above, steps 202 through 214 are repeated. If Y is determined to be 3,001 at step 214, that is, if Y is the word following the $Y^{th}$ (=3000) word "ZZZ," step 216 in FIG. 2 will be performed. At step 216, based on the detection frequencies obtained for the alphabetic characters which may be detected after each alphabetic character of each of the selected 3,000 words, the probability value for each of the 26 alphabetic characters, which may be detected after each alphabetic character of each word, is computed. More specifically, the probability value for each of alphabetic characters "A" through "Z," which may be detected after alphabetic character "A," is computed. Similarly, the probability value for each of alphabetic characters "A" through "Z," which may be detected after alphabetic character "B," "C," . . . or "Z," is computed.

At next step 218, the computed probability value for each of the 26 alphabetic characters, which may be detected after a particular alphabetic character, is databased at the memory of the mobile terminal. In the example table shown in FIG. 4, the probability that "B" among alphabetic characters "A" through "Z" will be detected after the detection of alphabetic character "B" is 20%. Also, the probability that "A" among alphabetic characters "A" through "Z" will be detected after the detection of "Z" is 20%. A table showing such probability values is databased at the memory of the mobile terminal. If the probability value for each of the 26 alphabetic characters which may be detected after any particular alphabetic character is databased at the mobile terminal according to the embodiment of the present invention as explained above, the user can easily input alphabetic characters on the mobile terminal. That is, the user can easily input alphabetic characters on the mobile terminal with a minimized number of key inputs.

Figure 5:
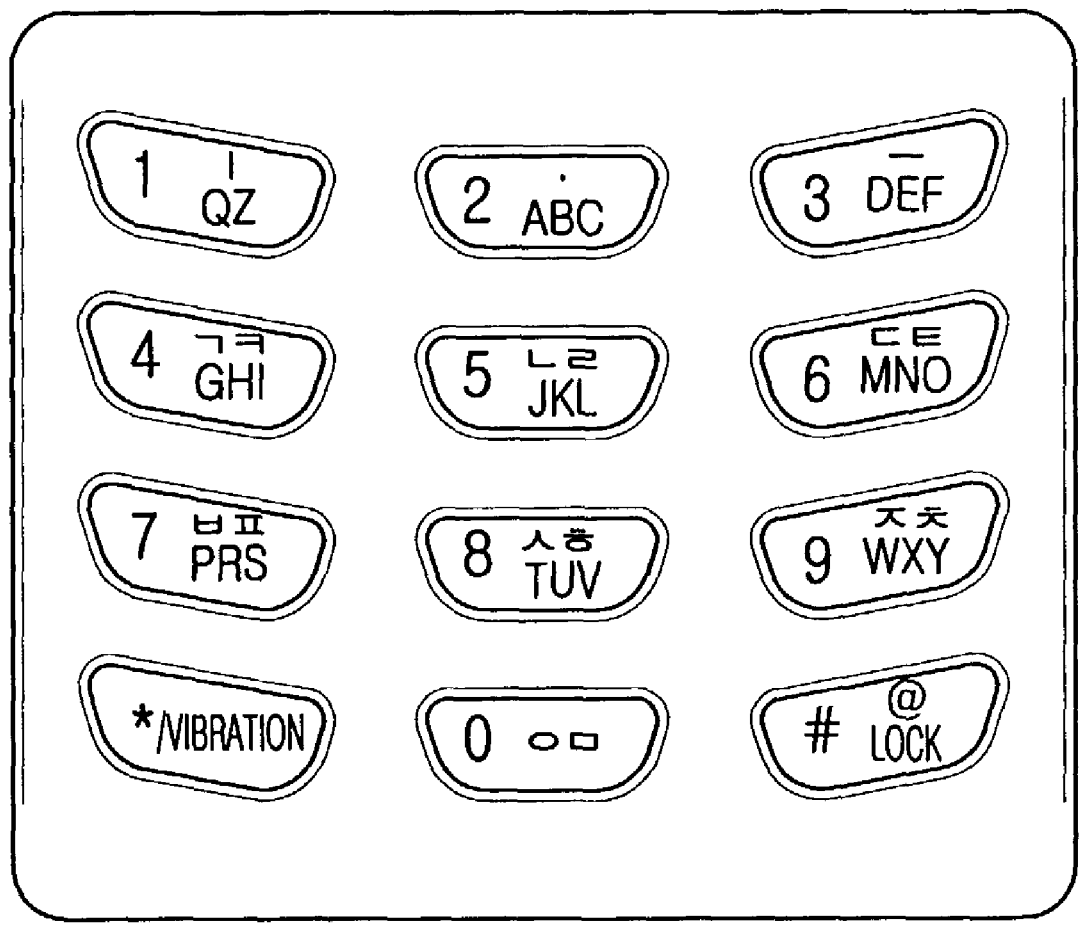
FIG. 5 is a schematic view of a key input section according to the embodiment of the present invention.
Figure 6:
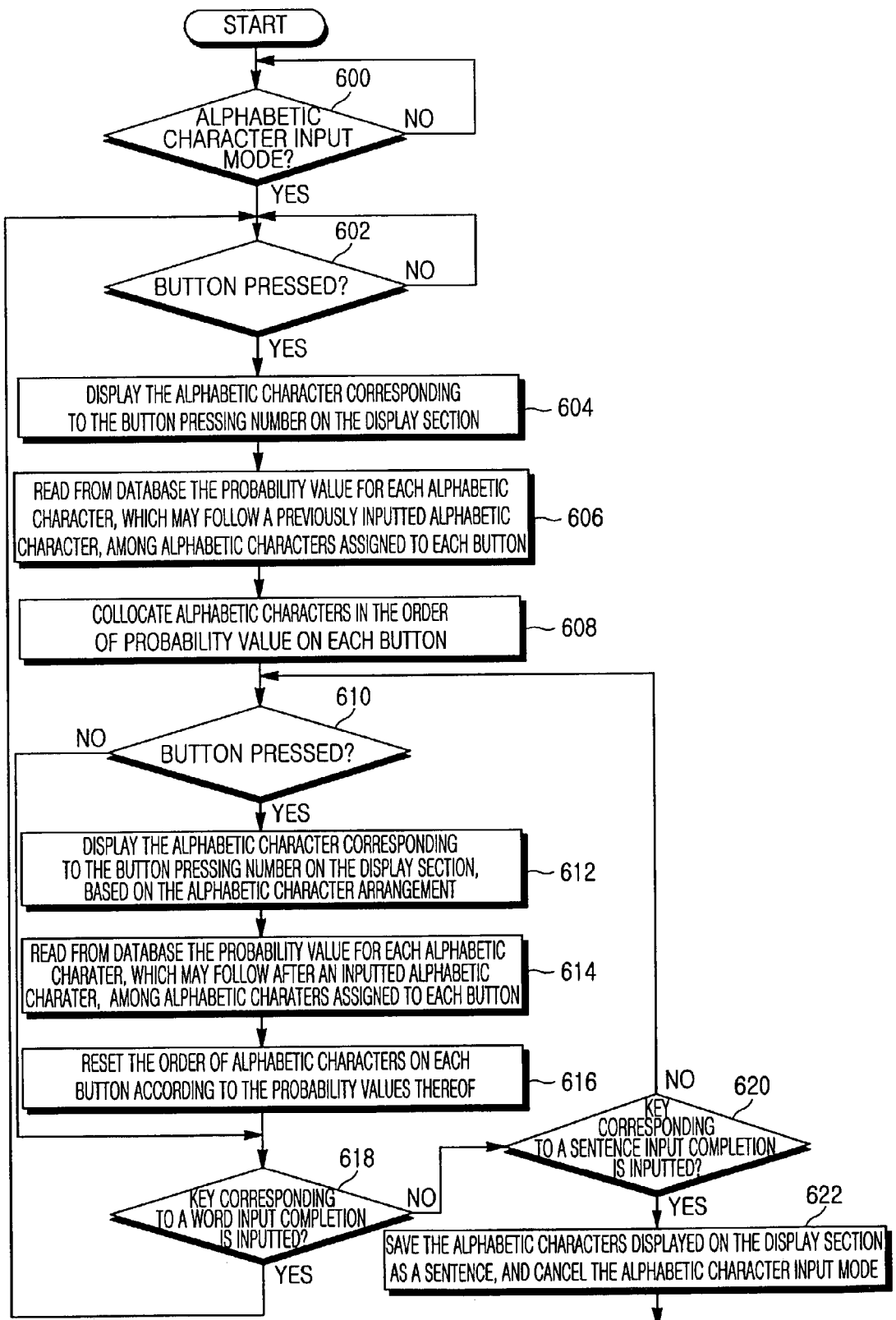
FIG. 6 is a flow chart showing an alphabetic character input mode according to the embodiment of the present invention.

FIG. 5 illustrates the key input section according to the embodiment of the present invention. FIG. 6 is a flow chart showing an alphabetic character input mode according to the embodiment of the present invention.

With reference to FIGS. 1, 5 and 6, it will be explained how alphabetic characters can be inputted on a mobile terminal with a memory storing the probability value for each of the 26 alphabetic characters being detected after any particular alphabetic character, according to the embodiment of the present invention.

The control section 16 determines whether the mobile terminal is in alphabetic character input mode at step 600 in FIG. 6. The "alphabetic character input mode" refers to a mode required for an alphabetic character inputting operation to prepare a letter message or a scheduler. In alphabetic character input mode, the control section 16 determines at step 602 in FIG. 6 whether a button of the key input section 10 is pressed by the user. As shown in FIG. 5, buttons are inscribed with numbers, alphabetic characters and characters of the Korean alphabet. Each of buttons numbered "1" to "9" is inscribed with two or three alphabetic characters.

If there is a button input by the user, the control section 16 displays an alphabetic character corresponding to the button input number on the display section 12 at step 604 in FIG. 6. In other words, an alphabetic character inputted by the user according to the number of times a first button is pressed, based on a first alphabetic character arrangement preset on the first button, is displayed as a first input alphabetic character on the display section 12. The first alphabetic character arrangement refers to the preset order of alphabetic characters inscribed on each of buttons numbered "1" to "9." For example, if the user presses the button numbered "5" once, the first alphabetic character "J" of the preset alphabetic character arrangement "J"-"K"-"L" on that button is displayed on the display section 12. If the user presses the same button twice, the display section 12 displays "J" at the first press and then "K" as the inputted alphabetic character at the second press.

At step 606 in FIG. 6, the control section (16) reads from the database the probability value for each alphabetic character being entered after any particular alphabetic character inputted by the user, among alphabetic characters assigned to each button. That is, the control section 16 reads from the database the probability value for each of the alphabetic characters of being entered after the first input alphabetic character. For example, if the letter "B" is displayed as the first input alphabetic character on the display section 12, the control section 16 reads the probability value for each of the letters "A" to "Z," which may be entered after "B," from the memory database.

The control section 16 arranges alphabetic characters in the order of probability value. That is, alphabetic characters assigned to each button are arranged in the order of their probability values. As shown in FIG. 5, a first alphabetic character arrangement is changed to a second alphabetic character arrangement according to the probability values for alphabetic characters "A" to "Z," which may follow the first input alphabetic character. For example, as shown in FIG. 5, the button numbered "2" is assigned three alphabetic characters "A," "B" and "C." The first alphabetic character arrangement "A"→"B"→"C" may be changed to the second alphabetic character arrangement of "B"→"A"→"C" or "C"→"B"→"A" according to the probability values.

Thereafter, the control section 16 determines at step 610 in FIG. 6 whether a button of the key input section 10 is pressed. If a button is pressed by the user, the control section 16 performs the function required at step 612 in FIG. 6. The control section 16 displays an alphabetic character corresponding to the button input number on the display section 12, based on the second alphabetic character arrangement. In other words, an alphabetic character inputted by the user according to the pressing number of a second button, based on a second alphabetic character arrangement preset on the second button, is displayed as a second input alphabetic character on the display section 12. The second alphabetic character arrangement is the order of alphabetic characters on each of buttons numbered "1" to "9," which was changed according to the probability values for alphabetic characters "A" to "Z," which may follow the first input alphabetic character.

At step 614 in FIG. 6, the control section 16 reads from the database the probability value for each alphabetic character which is probable to follow an inputted alphabetic character, among alphabetic characters assigned to each button. That is, the control section 16 reads from the database the probability value for each of alphabetic characters, which may be entered after the second input alphabetic character. For example, if alphabetic character "A" is displayed as the second input alphabetic character on the display section, the control section 16 reads the probability value for each of alphabetic characters "A" to "Z," which may be entered after "B," from the database, as shown in FIG. 4. At step 616 in FIG. 6, the control section 16 arranges alphabetic characters according to the order of probability values. That is, the second alphabetic character arrangement is reset for the alphabetic characters assigned to each button on the key input section, according to the order of probability values for the alphabetic characters.

At step 618 in FIG. 6, the control section 16 returns to step 602 if a key corresponding to a word input completion is inputted, or proceeds with step 620 if there is no key input corresponding to a word input completion. At this time, a key corresponding to a word input completion includes a space key, which is inputted after completion of a word input.

At step 620 in FIG. 6, the control section 16 proceeds with step 622, if a key corresponding to a sentence input completion is inputted. If such a key is not inputted, steps 610 through 620 in FIG. 6 will be repeated. While repeating steps 610 through 620 to input a word, alphabetic characters subsequent to the first input alphabetic character can be inputted one after another based on the second alphabetic character arrangement.

At step 622 in FIG. 6, the alphabetic characters displayed on the display section are saved as a sentence, and at the same time, the alphabetic character input mode is cancelled.

As explained above, when inputting characters by pressing buttons on the key input section of the mobile terminal, the present invention arranges characters assigned to each button in the order of probability values for the characters, which may be entered after a previously inputted character. Thus, the present invention enables the user to easily input characters on the mobile terminal with a minimized number of key inputs. As a result, the life of the key pad of the mobile terminal will be extended.

In the embodiment of the present invention, alphabetic characters are used as example characters among various language characters. While the invention has been shown and described with reference to a preferred embodiment thereof, it will be understood by those skilled in the art that various changes in form and details may be made therein without departing from the spirit and scope of the invention as defined by the appended claims. The present invention can also be used to input Korean characters or characters of other languages on a wireless mobile terminal. Therefore, this invention is not to be unduly limited to the embodiment set forth herein, but to be defined by the appended claims and equivalents thereof.

What is claimed is:

1. A method of inputting characters on a wireless mobile terminal, the method comprising the steps of:
   (a) computing a probability value for each character which may be entered after a user inputs a particular character from among characters assigned to each button on a key input section of the wireless mobile terminal, and storing the probability value in a memory of the mobile terminal, the probability value based on a detection frequency of each character to be detected after a particular character in a preset number of words;
   (b) displaying on a display section, as a first input character, a character input by the user according to the number of times a first button has been pressed in a character input mode, based on a first character arrangement of a plurality of characters assigned to the first button;
   (c) upon input of the first character by the user, reading from the database the probability value for each probable character to be entered after the first input character, among characters assigned to all buttons of said key input section, before a second button is pressed;
   (d) rearranging the characters assigned to each button to generate a second character arrangement in the order of the probability values for the characters assigned to each button; and
   (e) if the second button is pressed by the user, displaying on a display section, as a second input character, a character input by the user according to the number of times the second button is pressed, based on the second character arrangement preset on a plurality of characters assigned to the second button.

2. The method according to claim 1, further comprising the steps of:
   (f) reading from the database the probability values for characters assigned to each button on said key input section, which may be entered after said second input character; and
   (g) resetting the second character arrangement for the characters assigned to each button on said key input section, according to the order of said probability values.

3. The method according to claim 2, further comprising the step of repeating the process from step (b), if a key corresponding to a word input completion is inputted by the user.

4. The method according to claim 2, further comprising the step of saving the input characters displayed on said display section, if a key corresponding to a sentence input completion is inputted by the user.

5. The method according to claim 3, further comprising the step of saving the input characters displayed on said display section, if a key corresponding to a sentence input completion is inputted by the user.

6. The method according to claim 1, wherein step (a) further comprises the steps of:
   (h) detecting a $Z^{th}$ character of a $Y^{th}$ word among preset words, where Z and Y are natural numbers;
   (i) determining whether the $Z^{th}$ character of the $Y^{th}$ word is the last character of the $Y^{th}$ word;
   (j) detecting a $Z+1^{st}$ character of the $Y^{th}$ word, if the $Z^{th}$ character of the $Y^{th}$ word is not the last character of the $Y^{th}$ word, and then increasing by 1 the detection frequency of said $Z+1^{st}$ character of the $Y^{th}$ word after the $Z^{th}$ character of the $Y^{th}$ word;
   (k) increasing the value of Y by 1, if the $Z^{th}$ character of the $Y^{th}$ word is the last character of the $Y^{th}$ word;
   (l) determining whether said value of Y is 1 higher than the number of said preset characters;
   (m) repeating the process from step (h), if said value of Y is not 1 higher than the number of said preset characters;
   (n) computing the probability value for each character detected after the detection of a particular character, according to said detection frequency, if said value of Y is 1 higher than the number of said preset characters; and
   (o) storing said probability value computed for each character, which may be detected after said particular character, in the memory of said wireless mobile terminal.

7. A method of inputting characters on a wireless mobile terminal, the method comprising the steps of:
   (a) computing a probability value for each alphabetic character, which is the probability of that character being entered after a particular alphabetic character that the user inputs by pressing a button, among the alphabetic characters assigned to each button on a key input section of the wireless mobile terminal, and databasing a probability value in a memory of the mobile terminal, said probability value based on the detection frequency of each alphabetic character to be detected after a particular alphabetic character in a preset number of words;
   (b) displaying on a display section, as a first input alphabetic character, an alphabetic character input by the user according to the number of times a first button has been pressed in alphabetic character input mode, based on a first alphabetic character arrangement preset on a plurality of alphabetic characters assigned to the first button;
   (c) upon input of the first alphabetic character by the user, reading from the database the probability value for each probable alphabetic character to be entered after the first input alphabetic character, among alphabetic characters assigned to all buttons of said key input section, before a second button is pressed;
   (d) rearranging the alphabetic characters assigned to each button to generate a second alphabetic character arrangement in the order of probability values for the alphabetic characters assigned to each button; and
   (e) if the second button is pressed by the user, displaying on the display section, as a second input alphabetic character, an alphabetic character input by the user according to the number of times a second button is pressed, based on the second alphabetic character arrangement preset on a plurality of characters assigned the second button.

8. The method according to claim 7, wherein step (a) further comprises the steps of:
  (f) detecting a $Z^{th}$ alphabetic character of the $Y^{th}$ word among preset words, where Z and Y are natural numbers;
  (g) determining whether the $Z^{th}$ alphabetic character of the $Y^{th}$ word is the last alphabetic character of the $y^{th}$ word;
  (h) detecting a $Z+1^{st}$ character of the $Y^{th}$ word, if the $Z^{th}$ alphabetic character of the $Y^{th}$ word is not the last alphabetic character of the $Y^{th}$ word, and then increasing by 1 the detection frequency of said $Z+1^{st}$ alphabetic character of the $Y^{th}$ word after the $Z^{th}$ alphabetic character of the $Y^{th}$ word;
  (i) increasing the value of Y by 1, if the $Z^{th}$ alphabetic character of the $Y^{th}$ word is the last alphabetic character of the $Y^{th}$ word;
  (j) determining whether said value of Y is 1 higher than the number of said preset alphabetic characters;
  (k) repeating the process from step (f), if said value of Y is not 1 higher than the number of said preset alphabetic characters;
  (l) computing the probability value for each alphabetic character, which may be detected after the detection of a particular alphabetic character, according to said detection frequency, if said value of Y is 1 higher than the number of said preset alphabetic characters; and
  (m) storing said probability value computed for each alphabetic character, which may be detected after said particular alphabetic character, in the memory of said wireless mobile terminal.

* * * * *